(12) United States Patent
Netz et al.

(10) Patent No.: US 8,115,164 B2
(45) Date of Patent: Feb. 14, 2012

(54) CALIBRATION DEVICE AND LASER SCANNING MICROSCOPE WITH SUCH A CALIBRATION DEVICE

(75) Inventors: Ralf Netz, Jena (DE); Wolfgang Bathe, Jena (DE); Joerg Steinert, Jena (DE); Werner Kleinschmidt, Adelebsen (DE); Ingo Fahlbusch, Goettingen (DE); Michael Brehm, Sulzbach-Laufen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 577 days.

(21) Appl. No.: 12/320,599

(22) Filed: Jan. 29, 2009

(65) Prior Publication Data

US 2009/0224174 A1 Sep. 10, 2009

(30) Foreign Application Priority Data

Jan. 30, 2008 (DE) .................. 10 2008 007 178

(51) Int. Cl.
*G01D 18/00* (2006.01)
(52) U.S. Cl. .................................... 250/252.1
(58) Field of Classification Search ............... 250/252.1
See application file for complete search history.

(56) References Cited

U.S. PATENT DOCUMENTS

| 5,838,435 | A | * | 11/1998 | Sandison | .................... | 356/243.1 |
| 6,355,919 | B1 | * | 3/2002 | Engelhardt | ................ | 250/201.3 |
| 2009/0008539 | A1 | | 1/2009 | Steinert | | |
| 2009/0153862 | A1 | | 6/2009 | Lecoq et al. | | |
| 2009/0303583 | A1 | | 12/2009 | Klose et al. | | |
| 2009/0310209 | A1 | * | 12/2009 | Aschwanden et al. | ........ | 359/291 |

FOREIGN PATENT DOCUMENTS

| DE | 10155002 A1 | 5/2003 |
| DE | 10228477 A1 | 1/2004 |
| DE | 102005020542 A1 | 11/2006 |
| DE | 10 2005 047 200 A1 | 4/2007 |
| EP | 1162450 A1 | 12/2001 |
| EP | 2071387 A1 | 6/2009 |
| JP | 2002168784 A | 6/2002 |
| WO | 9942885 A2 | 8/1999 |
| WO | 2004104522 A1 | 12/2004 |

OTHER PUBLICATIONS

K. M. Berland et al., Scanning Two-Photon Fluctuation Correlation Spectroscopy: Particle Counting Measurements for Detection of Molecular Aggregation, Biophysical Journal, vol. 71, Jul. 1996, pp. 410-420.

(Continued)

*Primary Examiner* — David Porta
*Assistant Examiner* — Mindy Vu
(74) *Attorney, Agent, or Firm* — Jacobson Holman PLLC

(57) ABSTRACT

A calibration device for managing a variety of performance tests and/or calibration tasks in a laser scanning microscope. The calibration device, which has focusing optics and a test structure arranged in the focal plane of the focusing optics, with structural elements detectable in reflected and/or transmitted light aligned to each other in a common mounting, can be switched into the microscope beam path in a laser scanning microscope, so that the pupil of the focusing optics coincides with the objective pupil of the laser scanning microscope or lies in a plane conjugated to it.

20 Claims, 5 Drawing Sheets

OTHER PUBLICATIONS

Eric O. Potma; Conor L. Evans; X. Sunney Xie, "Heterodyne coherent anti-Stokes Raman scattering (CARS) imaging," Optics Letters, vol. 31, No. 2, Jan. 2006, pp. 241-243.

Feruz Ganikhanov, Conor L. Evans, Brian G. Saar, and X. Sunney Xie, "High-sensitivity vibrational imaging with frequency modulation coherent anti-Stokes Raman scattering (FM CARS) microscopy"; Optics Letters, vol. 31, No. 12, Jun. 2006, pp. 1872-1874.

Berland et al., Scanning Two-Photon Fluctuation Correlation Spectroscopy: Particle Containing Measurements for Detection of Molecular Aggregation; Biophysical Journal, vol. 71, Jul. 1996, pp. 410-420.

Potma et al., Heterodyne Coherent Anti-Stokes Raman Scattering (CARS) Imaging; Optics Letters, vol. 31, No. 2, Jan. 2006, pp. 241-243.

Ganikhanov et al., High-Sensitivity Vibrational Imaging with Frequency Modulation Coherent Anti-Stokes Raman Scattering (FM CARS) Microscopy; Optics Letters, vol. 31, No. 12, Jun. 2006, pp. 1872-1874.

* cited by examiner

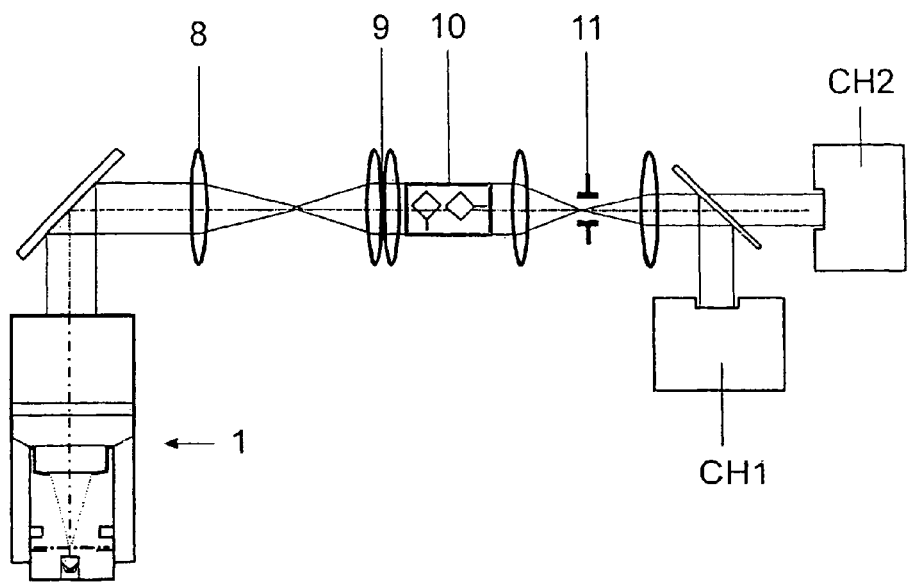
Fig. 4
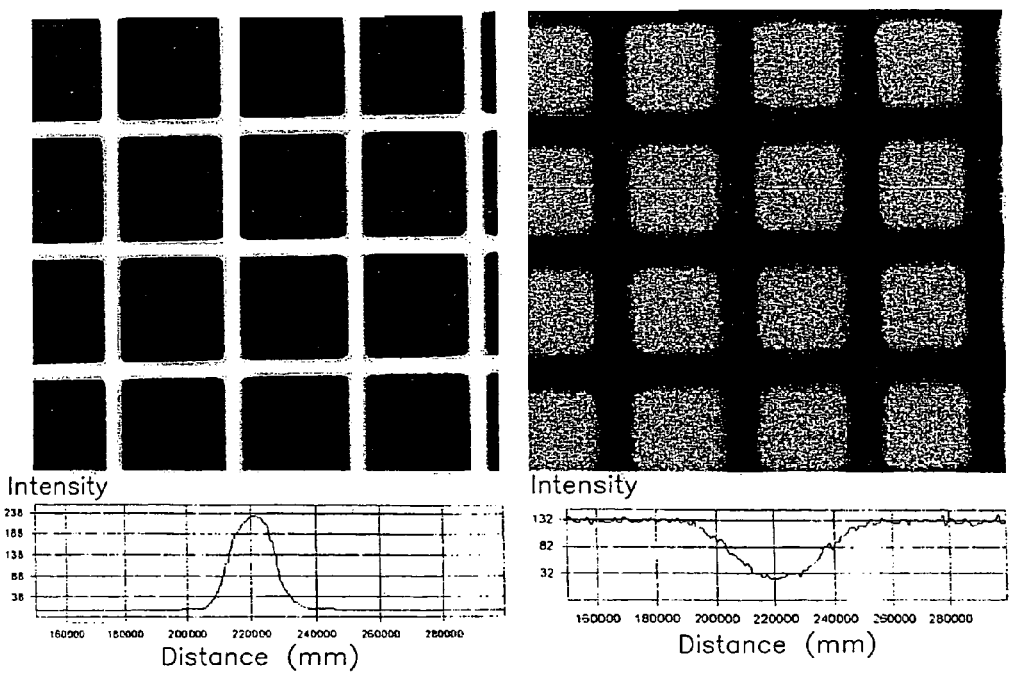
Fig. 5
Fig. 6

CALIBRATION DEVICE AND LASER SCANNING MICROSCOPE WITH SUCH A CALIBRATION DEVICE

CROSS-REFERENCE TO RELATED APPLICATIONS (Not Applicable)

STATEMENT REGARDING FEDERALLY SPONSORED RESEARCH OR DEVELOPMENT (Not Applicable)

REFERENCE TO A "SEQUENCE LISTING," A TABLE, OR A COMPUTER PROGRAM LISTING APPENDIX (Not Applicable)

BACKGROUND OF THE INVENTION (1) Field of the Invention (2) Description of Related Art Including Information Disclosed Under 37 CFR 1.97 and 1.98

Laser radiation generated by at least one laser as an excitation beam is guided in confocal laser scanning microscopes (LSM) via a scanner, scanning optics and a tube lens and is focused in a sample under investigation by means of an objective with limited diffraction. Because of interaction of the excitation beam with the sample or preparation, emitted fluorescence radiation goes via the scanner to a dichoroic beam splitter, which directs the fluorescence radiation into a detection beam path separately from the excitation radiation. The fluorescence radiation is then focused on a confocal diaphragm in the form of a pinhole, which is arranged in the detection beam path in a plane conjugated to the focal plane. After passing through a block filter to further suppress the excitation radiation, the fluorescence radiation is measured by means of a photomultiplier (PMT).

Due to the number of components, a variety of performance tests and calibration tasks exist in laser scanning microscopes that are of enormous significance during manufacture and for users. Consequently, there is the problematic task of managing the variety of performance tests and/or calibration tasks with simple means in time-saving fashion.

BRIEF SUMMARY OF THE INVENTION

The task is solved according to the invention by a calibration device, which has focusing optics and a test structure arranged in the focal plane of the focusing optics rigidly aligned to each other in a common mounting with structural elements detectable in reflected light and/or transmitted light.

The calibration device therefore forms a particularly resistant assembly with respect to temperature-related focus position changes, because of the fixed combination of focusing optics and calibration structure, with which the test image can be generated in an instrument system being tested, that is suitable for measurement and evaluation of the performance of the instrument system. It then does not matter how the test image is generated, as long as it has the desired properties, in which case a very small test structure with a high-magnification objective can be used as focusing optics. An equivalent test image can also be generated with a larger test structure and objective with lower magnification. Other overlapping adjustments can be performed. For example, undesired curvature of the focal plane of the focusing optics can be compensated by using a test structure adapted to this image field curvature. A desired flat test image on both sides is the result.

Overall, the following adjustments can be conducted on the calibration device:

1. Adjustment of the depth of field on the object side of the calibration device much greater than the thermal expansion of the employed materials permits implementation of a temperature-stable calibration device in simple fashion,
2. Compensation of geometric distortions of the focusing optics by the test structure, and
3. Compensation of a curved focal plane by using a curved structure.

Remaining imaging errors of the calibration device also need not necessarily mean a restriction in suitability as a calibration device. An imaging property that is not to be compensated, for example, is lateral chromatic aberration of the focusing optics, which shows the test structure in different size during detection of different wavelengths. Exact measurement of the magnification of a laser scanning microscope is possible by considering the lateral chromatic aberration of the focusing optics during evaluation of the measured test structure and calculating it out. In particular, replacement of the test structure without the required adjustment is advantageous, for which the mounting is designed, so that the lateral and axial position of the test structure always remains the same within the calibration device during replacement.

An advantageous modification of the invention consists of the fact that an illuminator designed to transmit light through the test structure in the direction of the focusing optics is adjacent to the test structure opposite the focusing optics. The illumination source, designed advantageously as an LED, can be mounted in a common mounting or the halogen lamp of the laser scanning microscope is used as a transmitted light source.

The test structure can advantageously have reflecting grating elements as structural elements. Such structural elements, consisting of chromium, for example, proved to be particularly suitable, since they permit calibration of the scanning field sizes, linearity of the scanner movement or correction of nonlinearities in the imaging properties of the optical system. In particular, the grating elements can be designed as gratings periodically structured in the x- and y-direction, which can also have different period lengths to implement different scanning frequencies.

The test structure can also contain structural elements for a star test.

For adjustment and calibration of modern microscopes that detect fluorescence light, calibration devices are required that can emit fluorescence light as a response to irradiation with excitation light. It is therefore advantageous where fluorescent intermediate grating areas are formed between the reflecting grating elements.

In one embodiment of the invention, the reflecting grating elements are applied to a radiation-transparent support and covered by a layer of fluorescent material. Appropriate solids or dye solutions can be provided as fluorescent material for one- and/or multi-photon excitation. It is also particularly advantageous, if the fluorescence light emitted by the fluorescent material has defined spectral and polarization properties, so that such properties can be recorded by the detection system of the microscope. Layer thicknesses of the fluorescent material that are much smaller than the axial focal length (for example, <100 nm) are particularly suitable for measurement of the excitation and detection PSF (point spread function).

In another variant, fluorescent glass or fluorescent semiconductor material can also serve as support of the reflecting grating elements.

To determine the illumination homogeneity in a laser scanning microscope, the test structure can be designed as a luminescent element with homogeneously luminescent surface areas and with a luminescent regular grating structure, in which the luminescent properties of the surface areas and the grating structure differ detectably.

Another embodiment of the invention proposes that the test structure contain a single-hole mask through which light can be transmitted to generate a point light source. The test structure can also be broken down into areas, in which one area has reflecting grating elements and fluorescent areas and another area is designed as a single-hole mask. Both geometric structures and areas of the test structure defined by material properties should be spatially separated, so that different calibration processes do not interfere with each other.

The task is further solved by a laser scanning microscope, in which a calibration device, which has focusing optics and a test structure arranged in the focal plane of the focusing optics with structural elements detectable in reflected light and/or in transmitted light, firmly aligned in a common mounting, can be switched into the microscope beam path. In particular, switching into the microscope beam path is proposed at positions, where the pupil of the focusing optics coincides with the objective pupil of the laser scanning microscope or lies in a plane conjugated to it.

In a preferred embodiment, the calibration device is mounted together with additional objectives in a multiple objective changer. It is particularly advantageous, if the focusing optics of the calibration device has a shortened adjustment length (distance between the object plane in the preparation and the contact surface of the objective on the multiple objective changer) relative to the additional objectives in the multiple objective changer. Because of this, by switching the calibration device according to the invention into the microscope beam path, calibration measurements can also be conducted while an application preparation is situated on the stage of the microscope. A collision with the preparation can be ruled out by this.

The object of the invention is also a method for determination and correction of the state of adjustment between the excitation and detection beam path of a laser scanning microscope.

Simultaneous recording of the reflection and transmitted light image of detection channels separated from each other is essential for optimal signal adjustment in the method, so that changes cannot have a negative effect on the deflection device (for example, drift-jitter of the center point of the scan field). Determination and correction of respective position deviations can occur automatically by cross-correlation.

BRIEF DESCRIPTION OF THE SEVERAL VIEWS OF THE DRAWINGS

The invention will be further explained below with reference to the schematic drawing. In the drawing:

FIG. 4 shows a calibration device arranged in the beam path of a confocal laser scanning microscope for determination of the state of adjustment between the excitation and detection beam path FIG. 5 shows a reflection image of a test structure with reflecting grating elements FIG. 6 shows a transmitted light image of the same test grating as in FIG. 5

DETAILED DESCRIPTION OF THE INVENTION

Figure 1:
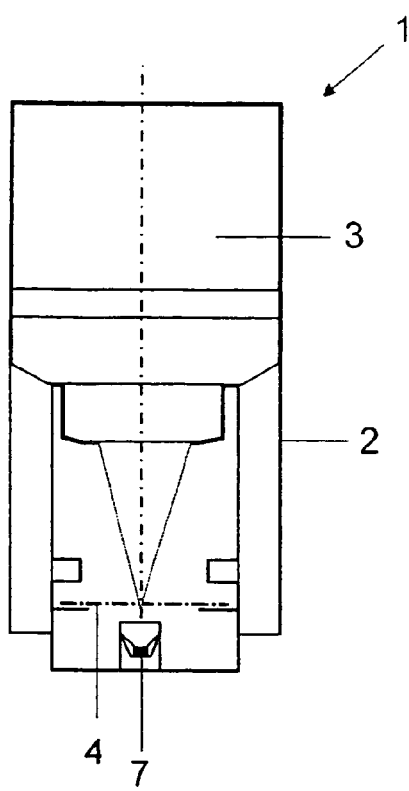
FIG. 1 shows a first embodiment of a calibration device according to the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The calibration device 1 depicted in FIG. 1 contains focusing optics 3 and a test structure 4, arranged replaceable in the focal plane FE of focusing optics 3 and adjusted to focusing optics 3 in a common mounting 2. The fixed positioning of focusing optics 3 and test structure 4 relative to each other guarantees the ability to conduct control measurements over time. The test structure 4 has geometric structural elements and/or elements defined by material properties that are detectable in reflected light and/or transmitted light.

Figure 3:
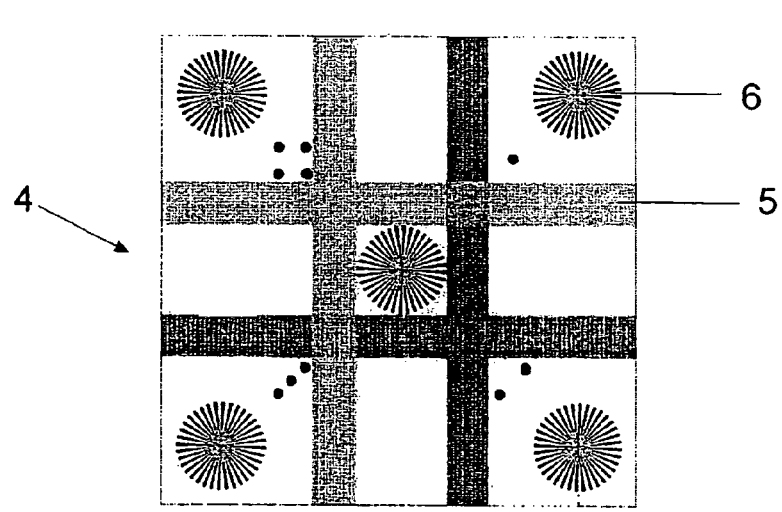
FIG. 3 shows a test structure for adjustment and calibration of geometric microscope quantities.

In the embodiment according to FIG. 3, the structural elements are designed as test gratings with reflecting grating elements 5, for example, for linearization or calibration of the scanner movement or for a star test as a Siemens star 6. The structure widths should lie in the magnitude of the point spread function (PSF) of focusing optics 3. If they lie below the PSF, the light-dark contrast is reduced in transmitted light. A first variant of the calibration device 1 contains an illuminator 7 connected to mounting 2 for wide field illumination, like an LED, which is opposite the test structure 4 adjacent to the focusing optics 3 and therefore designed for transmission through the test structure 4 in the direction of focusing optics 3.

Figure 2:
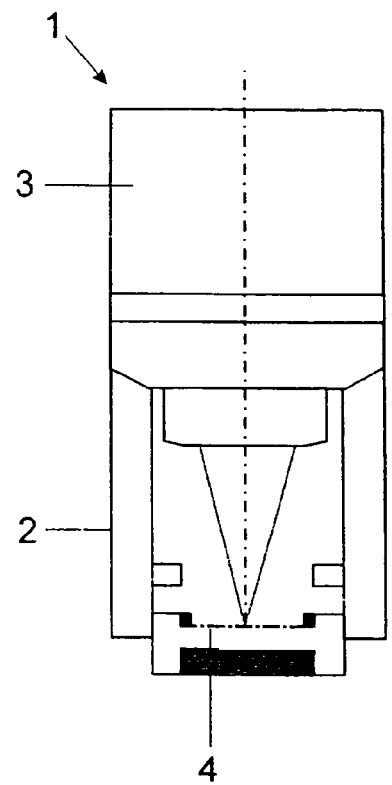
FIG. 2 shows a second embodiment of the a calibration device according to the invention.

The embodiment of the calibration device 1 depicted in FIG. 2 is preferably provided for adjustment and calibration tasks in reflected light and, in contrast to the embodiment according to FIG. 1, dispenses with an illuminator integrated in the device. The structural elements of the test structure replaceably connected to the mounting fulfill their purpose by fluorescence properties of solid or liquid materials, in addition to their geometric shape and arrangement relative to each other.

Figure 14:
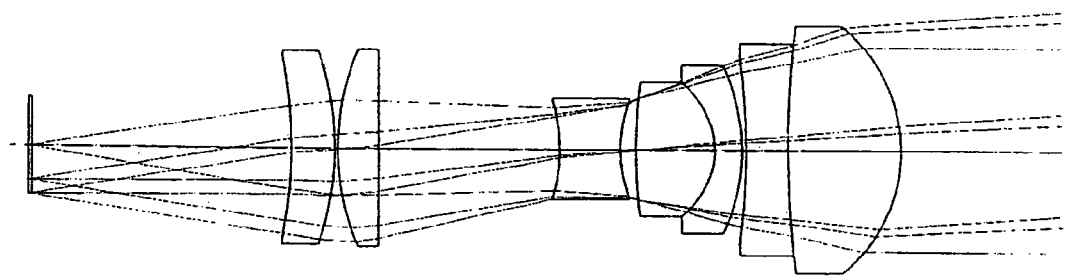
FIG. 14 shows a lens section through a focusing optics provided in the calibration device.

For both embodiments according to FIGS. 1 and 2, a Plan-Apochromat 5×/0.16 according to FIG. 14 is preferably used as the focusing optics. A number of automatable calibration and test tasks can be carried out with the calibration device according to the invention.

Quality of the State of Adjustment Between the Excitation and Detection Beam Path An essential state characteristic that determines the performance of a laser scanning microscope is the quality of the adjustment state between the excitation beam and detection beam path, which is characterized by an identical position of the image of the pinhole and the excitation beam in the preparation or an identical position of the image of the excitation beam in the pinhole plane and of the pinhole.

To determine the state of adjustment, an optical arrangement according to FIG. 4 is used, in which a calibration device 1, designed according to FIG. 1, is brought into the beam path of a confocal laser scanning microscope, part of the beam path of which is shown with tube lens 8, scanning objective 9, scanner 10 and pinhole 11. Two receiving channels CH1 and CH2 for simultaneous image recording are arranged after pinhole 11 in the detection beam path, in which a reflection image is recorded in channel CH1 and a transmitted light image of the test structure 4 is recorded in the other channel CH2. Should detection be impossible in reflection, because of unduly large laser suppression, the fluorescence generated by the excitation beam can also be detected as a reflected light image with pinhole 11 open. In this way, the position of the excitation beam path can also be determined and only the light areas of a reflection image then appear dark in the image.

The calibration device 1 is brought into the beam path, so that the pupil of the focusing optics 3 coincides with the objective pupil of the laser scanning microscope or lies in a plane conjugated to it. Recording of the calibration device 1 in a multiple objective changer or objective revolver, not physically shown in FIG. 4, is preferred, so that the effect of temperature-dependent expansion effects is minimized and the test structure 4 remains in focus.

FIGS. 5 and 6 show test images recorded simultaneously in the two receiving channels CH1, CH2, in which the reflection image in FIG. 5 originates from a test grating with a 20 µm grating period, which was illuminated with a 488 nm beam of an argon laser, and the transmitted light image in FIG. 6 is produced by the same test grating by means of LED illumination 7. By evaluation of the structural positions in both test images, the quality of the state of adjustment of the excitation beam and detection beam path can be established, FIG. 5 representing excitation by means of a laser spot and FIG. 6 representing detection, i.e., the pinhole position.

Figure 7:
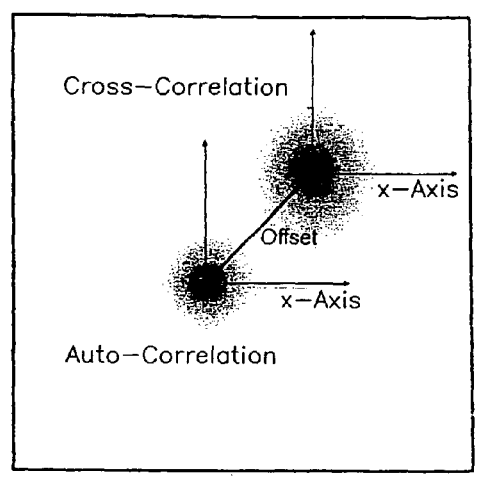
FIG. 7 shows a correlation window for adjustment state determined by means of image recording with reference to a reflection and transmitted light image between the excitation and detection beam path
Figure 8:
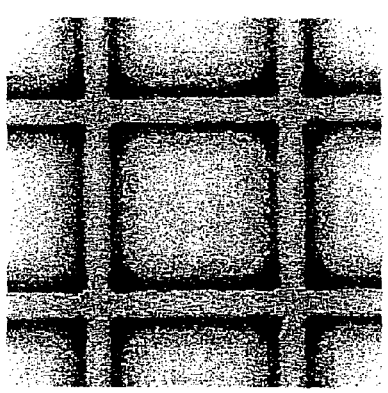
FIG. 8 shows a superposition of the reflection and transmitted light image from FIGS. 6 and 7
Figure 9:
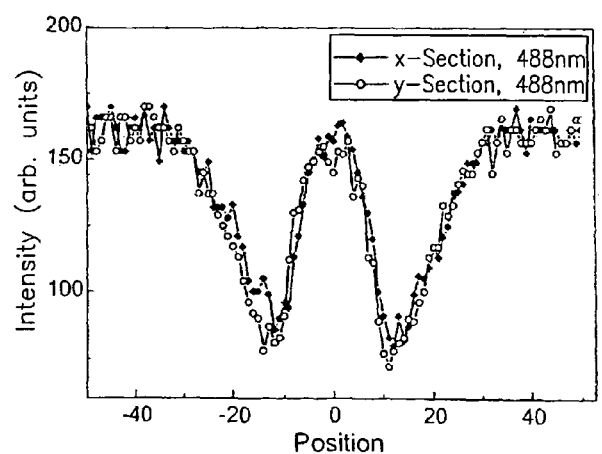
FIG. 9 shows a section in the x- and y-direction through the image structure superimposed on FIG. 8

According to FIG. 7, an offset between excitation and detection can be established by preferably automatic cross-correlation, in which the transmitted light image, however, should be inverted before evaluation. Overlap correction of excitation and detection occurs by superposition of the coordinate origins, which can also be automated. It is also possible with the invention to evaluate the pinhole positioning visually by superpositioning of the two test images, as shown in FIGS. 8 and 9.

The arrangement according to FIG. 4 also permits measurement of a signal-to-noise ratio (SNR) or ratios (SNRs), in which the fluorescence light of a volume sample is simulated by means of essential homogeneously emitted LED light, in which the SNR is decidedly influenced by the calibration of the pinhole size. If a white light LED is used, SNR measurements can be conducted in different spectral regions. In order to be able to record the detection efficiency trend in comparable fashion over a larger time period, the same filter adjustments and the same LED current must be chosen.

Measurement of Signal-To-Noise Ratio (SNR) Test with a Fluorescent Solid or Liquid Calibration Sample A homogeneously fluorescent area of the calibration device 1 is illuminated with a defined excitation light power and the fluorescence light then detected and evaluated. To determine the detection efficiency of the microscope, the signal-to-noise ratio (SNR) is ordinarily calculated after determination of the standard deviation and the mean value, according to which SNR=mean/standard deviation.

Measurement of Signal-To-Noise Ratio (SNR) with a Calibrated Point Light Source (for Example, a 1Airy-LED)

The result of a signal-to-noise ratio measurement in the confocal microscopy is essentially determined by the calibration of the confocal diaphragm (the pinhole). For example, if the image of the confocal diaphragm in the sample space of the microscope is greater than 1Airy in diameter, too much fluorescence light is detected and an unduly large SNR is determined. A calibrated point light source that emits isotropically into the half-space within calibration device 1 provides a remedy, in which the opening of the point source must be smaller than the maximum image diameter of the confocal diaphragm in the sample space. During adjustment of the maximum size of the confocal diaphragm, the SNR determination is configured independently of calibration of the confocal diaphragm.

The test structure 4 of the calibration device 1 is designed, in practice, to generate the point light source as a one-hole mask that can be traversed in transmitted light, in which the opening can be made very precisely with defined geometric dimensions, for example, by microstructuring methods. A light-emitting diode (LED) integrated in the calibration device according to FIG. 1 can be provided as a light source. If the opening of the calibrated point light source is greater than the diffraction limit of the focusing optics 3 in the calibration device 1, it will be useful to use a Lambert emitter light source (LaED), in order to be able to exploit the numerical aperture of the focusing optics 3. For an opening smaller than the diffraction limit, the diffraction on the small opening ensures filling of the numerical aperture.

If the point light source is calibrated in the sense that the number of photons emitted per unit time, per unit surface and per solid angle is known, measurement also permits determination of the absolute detection efficiency of the system.

Coupling of Test Signals into the Sample Area Via a Modulable Light Source in Order to be Able to Test Detection Units for Hardware and Software Functions Coupling of test signals into the sample area via a modulable light source, for example, an LED, also fiber-based, can be done in order to be able to test detection units for hardware and software functions, such as for example, fluorescence correlation spectroscopy (FCS) or heterodyne CARS or FM-CARS.

A calibrated isotropic point light source within the calibration device 1, like a single-hole mask, through which transmitted light can be passed with a microstructured opening and an LED as a transmitted light source, is suitable not only for determination of the detection efficiency of a confocal microscope, but can also be of great benefit for other methods based on the confocal principle.

Fluorescence correlation spectroscopy (FCS) permits acquisition of dynamic information about the movement of fluorescent molecules in cells or simply in solutions (See for example: Scanning Two-Photon Fluctuation Correlation Spectroscopy: Particle Counting Measurements for Detection of Molecular Aggregation; K. M. Berland, P. T. C. So, Y. Chen, W. W. Mantulin and E. Gratton, Biophysical Journal, Vol. 71, July 1996, 410-420). For very low dye concentrations (nM) in the confocal volume, a series of fluorescence photon pulses is formed, precisely when a moving dye molecule passes the focus. The length of a fluorescence light pulse train is determined by the time (diffusion time) that the molecule requires to pass through the confocal volume, whereas the intensity is determined by the molecular "brightness," the product of the extinction coefficient and quantum yield. The average time between two pulse events is inversely proportional to the average number of particles in the focus volume.

Error-free correlation analysis presupposes perfectly functioning hardware (optics, detectors plus electronics, etc.) and software (correlation algorithms, mathematical models and FIT routines). Defined simulated optical test signals (for example, light pulses), that simulate the response of diffusion of dye molecules with defined molecular "brightness" can be coupled to the microscope system and evaluated by means of the isotropic, calibrated point light source in calibration device 1, so that the performance (hardware and software) of the instrument can be determined for the application. In another embodiment, the optical test signals can be coupled into the calibration device via an optical fiber instead of with the single-hole mask that can be traversed by transmitted light.

In addition to FCS, the feeding of phase- and frequency- and/or amplitude-modulated optical test signals (via the test structure 4 in the calibration device 1) also works for hardware and software test purposes for "coherent anti-Stokes Raman scattering microscopy" (CARS microscopy). The CARS signal, which has its origin in a non-linear electrical susceptibility of order 3, has a resonant and non-resonant fraction:

1. Heterodyne coherent anti-Stokes Raman scattering (CARS) imaging; Eric O. Potma,* Conor L. Evans and X. Sunney Xie, Optics Letters, Vol. 31, No. 2, January 2006, 241-243

2. High-sensitivity vibrational imaging with frequency modulation coherent anti-Stokes Raman scattering (FM CARS) microscopy; Feruz Ganikhanov, Conor L. Evans, Brian G. Saar, and X. Sunney Xie, Vol. 31, No. 12, June 2006, 1872-1874.

The non-resonant fraction is particularly the cause for the fact that the CARS signal is not free of background and is reduced according to the contrast in the CARS microscopy. By appropriate phase- and frequency-modulation of the light sources, an amplitude-modulated CARS signal to be detected can be generated, so that the contrast-rich background-free signal (resonant CARS image) can be determined by hardware and software analysis/filtering.

Measurement of Resolution/Point Spread Function (PFS)

The performance of a confocal laser scanning microscope is not only determined by the detection efficiency for fluorescence light. It is essential that the excitation focus be diffraction-limited, so that both the maximum resolution according to the employed objective is obtainable, and the maximum amounting of fluorescence light can be detected in a pinhole closed to 1Airy, i.e., at optimal "z-sectioning". Under the requirement that the focusing optics focuses in the calibration device with diffraction limitation, deviations in the focusability indicate errors in the illumination and/or detection optics.

Errors can be caused, for example, by deformed mirrors, shadow effects by improperly positioned color dividers, incorrectly adjusted tube lenses or scanning objectives, etc.

The quality of the imaging system can be characterized by the modulation transmission function (MTF), or if phase shifts occur, by the complex optical transmission function (OTF). Measurement of the transmission function can be carried out by analysis of the image of a grating structure, the image of a point-like opening (point spread function—PFS) or by analysis of the image of an edge or gap. The test structure can contain structural elements for determination of the transmission function, in order to be able to evaluate their images with appropriate software to make assertions concerning the optical performance of the microscope.

Measurement of Scanner Linearity/Scanner Calibration

Calibration of signals for scanner control is described, for example, in DE 10 2005 047 200 A1 which is incorporated by reference herein. The structural elements of the test structure can be configured simply, so that optical evaluation is possible for calibration of the scanner. The position signals of a position sensor, which is used to measure the scanner position or the actual measurement position in the scanning image, can also be calibrated. Calibration can include measurement of the transmission functions of the position signals or the control signals (DE 10 2005 047 200 A1).

Appropriate simple structural elements or calibration of the scanner control signals include periodic gratings. Advantageously, the test structure 4 contains four periodic gratings, both in the X- and Y-direction. The same area of the test structure 4 can then also be periodically structured simultaneously in the X- and Y-direction. Gratings with different period lengths are advantageously present, in order to be able to carryout calibration with highly different scanning amplitudes.

Excitation Suppression and Transmission of the Detection Beam Path

In fluorescence microscopy, fluorescent objects are recorded, in which the fluorescence microscope makes the excitation light necessary for fluorescence available. The wavelengths of the excitation light and the fluorescence light emitted by the object depend on the dye. Because of different wavelength ranges of fluorescence and excitation light, spectral separation can be performed. This property is utilized to keep the excitation light away from the detector of the fluorescence microscope. Because of a generally much lower intensity of fluorescence light relative to the excitation light, "good" fluorescence microscopes detect the emitted fluorescence light with the highest possible efficiency, in which the excitation light is very strongly suppressed at the same time.

Figure 10:
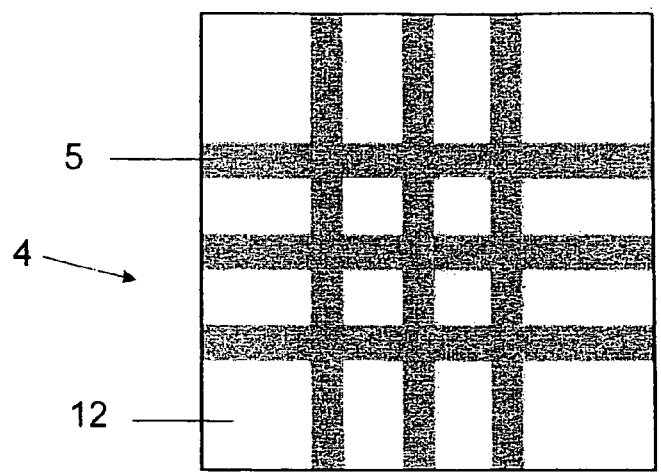
FIG. 10 shows a test structure with reflecting grating structures and fluorescent intermediate grating areas

If an assertion is to be made concerning the quality of a fluorescence microscope, determination of the excitation suppression and detection efficiency is essential. A test structure 4 of the calibration device 1 according to FIG. 10 is used, in which reflecting grating elements 5 are provided as structural elements and fluorescence intermediate grating areas 12 with known fluorescence efficiency between the reflecting grating elements 5. In a test image recorded by test structure 4, intensities of pixels that pertain to the reflecting grating elements 5 and pixels that pertain to the fluorescent intermediate grating areas 12 are evaluated separately. In this case, averaging of the intensity values can be conducted. Based on the known fluorescence efficiency, a conclusion concerning the intensity of the excitation light can be drawn from the fluorescence intensity signal. If the fluorescence intensity signal is related to the measured reflection intensity on the reflecting grating elements 5, a gauge of the excitation suppression is obtained.

In another method based on knowledge of the PMT-Gain characteristic and the calibrated AOTF characteristic, a PMT signal is first determined by the laser in reflection with filter adjustments that permit direct detection of the laser light, for example, by using a neutral main color divider with known transmission curve (for example, HFT80/20). The PMT high voltage, generally referred to as PMT-Gain, should then be as low as possible. A fluorescence filter being measured is then introduced into the beam path, the PMT high voltage, and optionally also the laser power, are increased with known AOTF transmission, until roughly the same signal is obtained as during direct detection of the laser light. The laser suppression can be calculated from the known characteristics of the fluorescence filter. Measurements for suppression with OD4 to OD5 are possible with this method, OD standing for optical density.

Determination of the transmission of the detection beam path requires additional aids, in which the transmission is measured directly with the known reference light source, or in which the excitation power, especially the laser scanning microscope, is measured with a laser power meter.

Determination of Illumination Homogeneity

Especially for quantitative microscopy, it is important to know how bright an object under the microscope was illuminated. An ideal microscope "treats" all points within the image field the same; with reference to brightness, this means that equally bright luminescent objects are also shown equally bright in the microscope image. In practice, this requirement can, at best, be met approximately. Especially toward the edge of the microscope image, the brightness of the image frequently diminishes, for example, because of optical vignetting.

Figure 11:
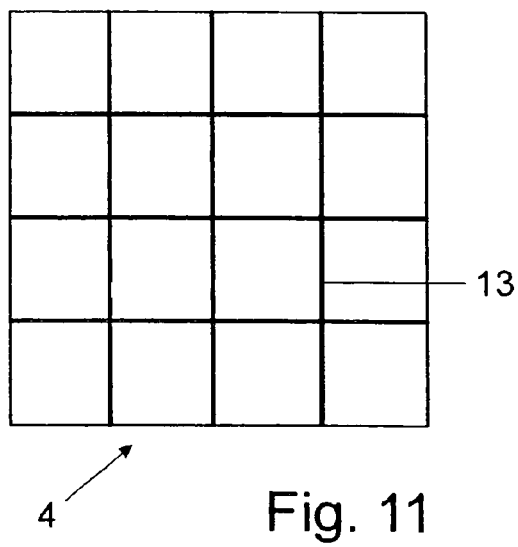
FIG. 11 shows a test structure with homogeneously luminescent surface and luminescent grating structure situated on it

The illumination can be simply determined with the calibration device according to the invention, in which the brightness of test structure 4 is measured as a function of location. Homogeneous surfaces or volumes that can be designed reflecting, scattering, fluorescent or self-illuminating, adapted to the device being tested, are suitable for determination of illumination. In the present embodiment as shown in FIG. 11, the test structure 4 is designed as a homogeneously luminescent surface, which contains additional structural elements in the form of a quadratic grating structure 13 for additional calibration purposes, like measurement of the geometry of the image field.

The additional structural elements differ from the homogeneously luminescent surface, in which they are brighter or darker or illuminate in other wavelength ranges. Nonhomogeneities of the test image generated by the additional structural elements do interfere initially, but the homogeneity of the image field can be determined by calculating out the additional structural elements from the recorded test image, if the following prerequisites are met:

1. The additional structures are known.
2. The illumination profile of the microscope changes over the image field generally only slowly and steep incursions are not to be expected.

Figure 12:
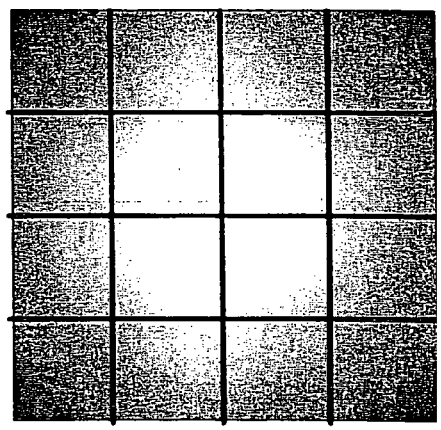
FIG. 12 shows a test image recorded by the test structure according to FIG. 11
Figure 13:
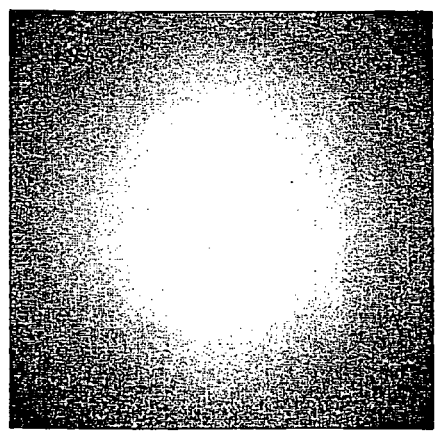
FIG. 13 shows the test image according to FIG. 12, cleared from the grating structure

In the recorded test image (FIG. 12), the intermediate grating areas are no longer homogeneous, in which the brightness diminishes toward the image edge. The grating structure can also be seen. In the reprocessed test image (FIG. 13), the grating structure was removed, so that the illumination image remains. The brightness in the areas covered by the test grating can be determined by interpolation, which is reliable, as long as the illumination profile of the microscope contains no abrupt changes.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A calibration device for calibration of a laser scanning microscope with a light source, the calibration device comprising:
    focusing optics (3) having a focal plane;
    a test structure (4) with structural elements arranged in the focal plane of the focusing optics (3);
    mounting means (2) for providing a common mounting of the focusing optics and the test structure relative to each other; and
    structural elements detectable in reflected light and/or in transmitted light from the light source.

2. The calibration device according to claim 1, further comprising an illuminator (7), designed to transmit through the test structure (4) in the direction of the focusing optics (3), the illuminator being adjacent to the test structure (4) opposite the focusing optics (3).

3. The calibration device according to claim 1, in which the test structure (4) includes structural elements in the form of reflecting grating elements (5).

4. The calibration device according to claim 3, in which the reflecting grating elements (5) are gratings periodically structured in the x- and y-direction.

5. The calibration device according to claim 4, in which the periodically structured gratings are structures for determining optical transmission functions.

6. The calibration device according to claim 4, in which the periodically structured gratings have different period lengths.

7. The calibration device according to claim 3, in which fluorescence intermediate grating areas (12) are formed between the reflecting grating elements (5).

8. The calibration device according to claim 7, in which the reflecting grating elements (5) are applied to a radiation-transparent support and covered by a layer of fluorescent material.

9. The calibration device according to claim 8, in which solids or dye solutions appropriate for at least one photon excitation are provided as fluorescent material.

10. The calibration device according to claim 3, further comprising fluorescent glass or fluorescent semiconductor material for supporting the reflecting grating elements.

11. The calibration device according to claim 1, in which the test structure (4) is designed as a luminescent element with homogeneously luminescent surface areas and with a luminescent regular grating structure, in which the luminescent properties of the surface areas and the grating structure are different.

12. The calibration device according to claim 1, in which the test structure (4) has a one-hole mask, through which transmitted light can be passed to generate a point light source.

13. The calibration device according to claim 1, in which the test structure (4) is broken down into areas, in which one area has reflecting grating elements (5) and fluorescent intermediate grating areas (12), and another area is designed as a one-hole mask, through which transmitted light can be passed.

14. The calibration device according to claim 1, in which the test structure (4) has a one-hole mask, through which transmitted light can be passed to generate a point light source.

15. A laser scanning microscope according to claim 1, including a multiple objective changer with a plurality of objectives and in which the focusing optics (3) of the calibration device has an adjustment length shortened relative to the additional objectives in the multiple objective changer.

16. The laser scanning microscope according to claim 15, including an objective pupil and wherein the pupil of the focusing optics (3) coincides with the objective pupil of the laser scanning microscope or lies in a plane conjugated to it.

17. A method for determination and correction of the state of adjustment between an excitation beam path and a detection beam path of a laser scanning microscope, which contains at least one laser to generate an excitation beam, a deflection device, which is designed for variable deflection of the excitation beam, at least one detection channel, and an objective pupil, the method comprising the steps of:

arranging the calibration device of claim 1 in the excitation and detection beam path of the laser scanning microscope with the objective pupil of the laser scanning microscope and the pupil of the focusing optics of the calibration device coinciding or being arranged in planes conjugated to each other;

scanning the test structure with the excitation beam to generate a reflection or fluorescence image of the test structure, and recording of the reflection or fluorescence image of the test structure;

transmitting light through the test structure to generate a transmitted light image of the test structure, and recording the transmitted light image of the test structure and identifying the positions of the test structure in the reflection or fluorescence image and the transmitted light image and determining the respective deviations of the positions.

18. The method according to claim 17, in which recording of the reflection or fluorescence image and the transmitted light image occur simultaneously in detection channels separated from each other.

19. The method according to claim 18, in which determination of correction of the mutual positions occurs automatically by cross-correlation.

20. The method according to claim 18, in which the fluorescence image of excitation and the transmitted light image of detection are inverted.

* * * * *